United States Patent [19]
Bi et al.

[11] Patent Number: 5,989,514
[45] Date of Patent: *Nov. 23, 1999

[54] PROCESSING OF VANADIUM OXIDE PARTICLES WITH HEAT

[75] Inventors: Xiangxin Bi, Pleasanton; James T. Gardner, Cupertino; Sujeet Kumar, Fremont; Nobuyuki Kambe, Menlo Park, all of Calif.

[73] Assignee: NanoGram Corporation, Fremont, Calif.

[*] Notice: This patent is subject to a terminal disclaimer.

[21] Appl. No.: 08/897,903

[22] Filed: Jul. 21, 1997

[51] Int. Cl.⁶ .............. C06B 33/00; B05B 3/00; C01G 31/00; C01B 13/14
[52] U.S. Cl. .............. 423/592; 149/37; 264/28; 419/31; 429/218; 423/62; 423/579; 423/592
[58] Field of Search .............. 423/62, 579; 149/37; 429/218; 419/31; 264/28

[56] References Cited

U.S. PATENT DOCUMENTS

| | | |
|---|---|---|
| 1,450,507 | 4/1923 | Mackay . |
| 2,298,091 | 10/1942 | Cooper, Jr. et al. . |
| 3,305,322 | 2/1967 | Henrickson . |
| 3,483,110 | 12/1969 | Rozgonyl .............. 204/192 |
| 3,607,005 | 9/1971 | Chambers .............. 23/16 |
| 4,035,476 | 7/1977 | Ilmaier et al. . |
| 4,119,707 | 10/1978 | Thome et al. . |
| 4,315,905 | 2/1982 | Bens et al. . |
| 4,393,095 | 7/1983 | Greenberg .............. 427/87 |
| 4,436,706 | 3/1984 | Nacken et al. . |
| 4,486,400 | 12/1984 | Riley . |
| 4,619,822 | 10/1986 | Hammou et al. . |
| 4,849,189 | 7/1989 | Jansz . |
| 5,258,245 | 11/1993 | Takata et al. . |
| 5,326,545 | 7/1994 | Koksbang et al. .............. 423/62 |
| 5,334,334 | 8/1994 | Koksbang .............. 264/28 |
| 5,336,830 | 8/1994 | Koksbang .............. 429/218 |
| 5,358,801 | 10/1994 | Brodd .............. 429/215 |
| 5,427,603 | 6/1995 | Samant et al. .............. 75/622 |
| 5,427,763 | 6/1995 | Lawton et al. . |
| 5,437,943 | 8/1995 | Fujii et al. .............. 429/192 |
| 5,443,809 | 8/1995 | Olsen .............. 423/592 |
| 5,482,697 | 1/1996 | Saidi . |
| 5,514,496 | 5/1996 | Mishima et al. .............. 429/218 |
| 5,545,496 | 8/1996 | Chang et al. . |
| 5,549,880 | 8/1996 | Koksbang .............. 423/593 |
| 5,578,094 | 11/1996 | Brooker et al. .............. 48/197 R |
| 5,589,300 | 12/1996 | Fauteux et al. .............. 429/218 |

OTHER PUBLICATIONS

Lampe–Onnerud et al., Eur. J. Solid State Inorg. Chem., t. 32, pp. 293–302 (1995).

Ugaji et al., J. Electrochem. Soc., vol. 142, No. 11, pp. 3664–3668 (Nov. 1995).

West et al., Electrochimica Acta., vol. 28, No. 12, pp. 1829–1833 (1983).

*Primary Examiner*—Gary P. Straub
*Assistant Examiner*—Cam N. Nguyen
*Attorney, Agent, or Firm*—Westman, Champlin & Kelly, P.A.; Peter S. Dardi

[57] ABSTRACT

The stoichiometry and/or crystal structure of vanadium oxide particles are altered by heating initial particles of vanadium oxide under mild conditions. The temperature is generally at least about 300° C. less than the melting point of both the initial vanadium oxide particle and the product vanadium oxide particles. Preferred initial particles are vanadium oxide nanoparticles. The heating can be performed under an oxidizing atmosphere or an inert atmosphere, depending on the particular initial particles and the desired product particles.

25 Claims, 12 Drawing Sheets

PROCESSING OF VANADIUM OXIDE PARTICLES WITH HEAT

FIELD OF THE INVENTION

The invention relates to the conversion of the stoichiometry and/or crystal structure of vanadium oxide particles by applying heat.

BACKGROUND OF THE INVENTION

Vanadium can exist in various oxidation states. Correspondingly, vanadium oxides are known to exist with various stoichiometries. In addition, vanadium oxides with a particular stoichiometry can have various crystalline lattices, or they can be amorphous. Thus, vanadium oxides exhibit an extraordinarily rich phase diagram.

Vanadium oxides with various stoichiometries have been noted as promising materials for use in lithium based batteries. Appropriate vanadium oxides can intercalate lithium ions into their crystal structure. In addition, vanadium oxides are useful in a variety of other applications, for example, as catalysts for chemical reactions. Because of the interest in vanadium oxides, several approaches have been developed for producing vanadium oxides.

SUMMARY OF THE INVENTION

In a first aspect, the invention features a process for converting nanoparticles of vanadium oxide to other forms of vanadium oxide comprising the step of heating the nanoparticles of vanadium oxide in an oxidizing or inert atmosphere at a temperature at least about 300° C. below the melting point of both the nanoparticles of vanadium oxide particles and the other forms of vanadium oxide. The temperature preferably is between about 60° C. and about 800° C. and more preferably between about 60° C. and about 500°C.

The heating can be performed in an oxidizing atmosphere, which can include $O_2$, $O_3$, CO, $CO_2$ or combinations thereof. The oxidizing atmosphere can include between about 1 percent oxidizing gas and about 99 percent oxidizing gas by partial pressure. The oxidizing atmosphere can include flowing gas. The nanoparticles of vanadium oxide can include $VO_{1.27}$, $VO_2$, $V_2O_3$, $V_3O_5$, amorphous $V_2O_5$, or 2-D crystalline $V_2O_5$. The other forms of vanadium oxide can include 2-D crystalline $V_2O_5$ or crystalline $V_2O_5$. The nanoparticles of vanadium oxide preferably have an average diameter from about 5 nm to about 500 nm or more preferably from about 5 nm to about 150 nm.

In another aspect, the invention features vanadium oxide nanoparticles formed by heating in an oxidizing or inert atmosphere, vanadium oxide nanoparticles of a different form. The vanadium oxide nanoparticles of a different form preferably have an average diameter from about 5 nm to about 150 nm. In some embodiments, the vanadium oxide nanoparticles formed by heating have a higher oxygen to vanadium ratio than the vanadium oxide nanoparticles of a different form. The vanadium oxide particles formed by heating can include $V_2O_5$.

In another aspect, the invention features a process for forming vanadium oxide particles including the step of heating particles of vanadium oxide with a lower oxygen to vanadium ratio than the vanadium oxide particles to be formed, in an oxidizing atmosphere at a temperature at least about 300° C. below the melting point of both the vanadium oxide particles to be heated and the vanadium oxide particles to be formed. The temperature preferably is between about 60° C. and about 800° C., and more preferably between about 80° C. and about 500° C.

The oxidizing atmosphere can comprise $O_2$, $O_3$, CO, $CO_2$ or combinations thereof. The oxidizing atmosphere can include from about 1 percent oxidizing gas and 99 percent oxidizing gas by partial pressure. The initial vanadium oxide particles preferably have an average diameter from about 5 nm to about 1000 nm, and more preferably from about 5 nm to about 150 nm. The product vanadium oxide particles can comprise orthorhombic $V_2O_5$ crystals or 2-D $V_2O_5$ crystals.

In another aspect, the invention features a process for forming crystalline $V_2O_5$ including the step of heating amorphous $V_2O_5$ at a temperature at least about 300° C. below the melting point of both the amorphous $V_2O_5$ and the crystalline $V_2O_5$. The temperature preferably is between about 60° C. and about 800° C. The amorphous $V_2O_5$ particles preferably have an average diameter from about 5 nm to about 1000 nm.

The heat based processes described herein provide valuable pathways to producing important vanadium oxide materials. The processes are efficient and low cost. The techniques are particularly valuable for producing nanoparticles. Vanadium oxide nanoparticles produced using the heat based processes exhibit improved properties when incorporated into cathodes for lithium based batteries.

Other features and advantages of the invention follow from the detailed description and claims below.

DESCRIPTION OF THE PREFERRED EMBODIMENTS

Figure 1:
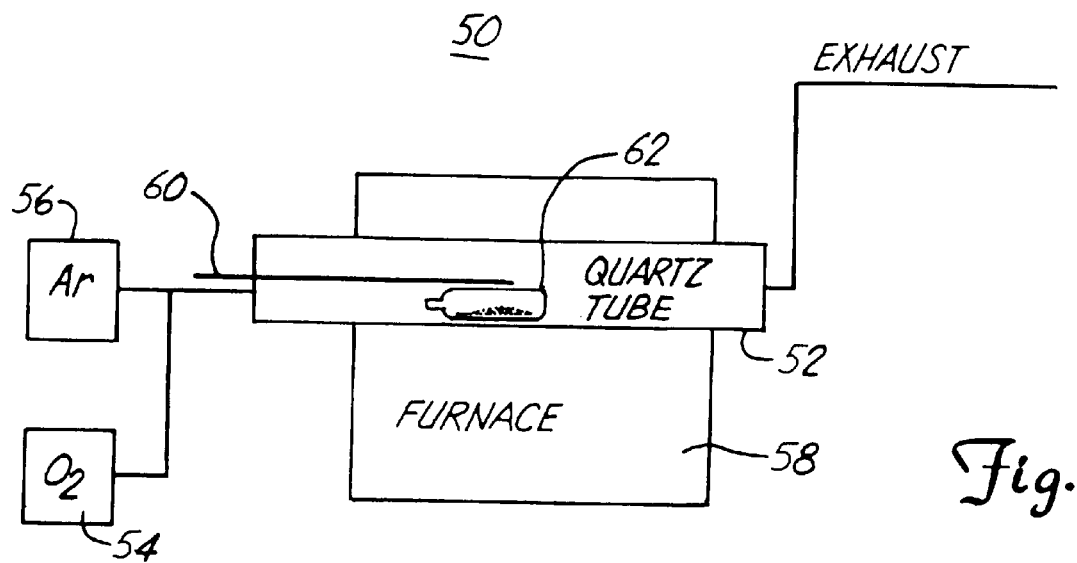
FIG. 1 is a schematic, sectional view of a oven for practicing the current invention taken through the center of the quartz tube.

A route for producing a variety of desirable vanadium oxide particles involves heating particles of an initial type of vanadium oxide to convert them to the product particles. The heating step generally is performed in an oxidizing atmosphere, although for certain starting materials and corresponding products, an inert atmosphere generally is sufficient. Using these processing techniques, vanadium oxide particles can be formed with a higher relative oxygen content and/or with a different crystal lattice relative to the starting material. The conversion results from heating at surprisingly low temperatures well below the melting point of the materials. With mild processing temperatures, the particles generally do not significantly sinter.

These processes are especially desirable for the processing of nanoscale particles, i.e., particles having a diameter below a micron. Since the particles do not significantly sinter, the nanoscale of the particles is preserved during the heat processing. Alternatively, the particles can be heated to slightly higher temperatures to sinter the particles in a controlled fashion to form somewhat larger particles, as desired.

It has been found that laser pyrolysis is a versatile technique for the production of nanoscale vanadium oxide particles. See, commonly assigned and simultaneously filed patent application Ser. No. 08/897,778, entitled "Vanadium Oxide Nanoparticles," incorporated herein by reference. These nanoscale vanadium oxide particles from laser pyrolysis provide useful starting material for further processing with heat. Therefore, the combination of laser pyrolysis along with heat processing provides the means to produce many forms of vanadium oxide nanoparticles, with alternative routes of production being available for, at least, some of the vanadium oxide nanoparticles.

Vanadium oxide nanoparticles produced by heat processing have been found to be especially useful for the production of lithium based batteries. In particular, when used as a cathode active material, the vanadium oxide nanoparticles produced by heat processing have been found to yield very high energy densities. Crystalline $V_2O_5$ nanoparticles have an energy density for lithium based battery applications several times the theoretical maximum energy density values of corresponding bulk (i.e., greater than micron sized) particles. Further description of batteries constructed from these nanoparticles is found in commonly assigned and simultaneously filed, U.S. patent application Ser. No. 08/897,776, entitled "Batteries With Electroactive Nanoparticles," incorporated herein by reference.

A. Particle Production

The vanadium oxide particles are preferably heated in an oven or the like to provide generally uniform heating. The processing conditions generally are mild. The temperature of heating is low relative to the melting point of both the starting material and the product material. The temperature generally is at least 300° C. below the melting point and preferably at least 450°C. below the melting point of either the starting material or the product material. For nanoparticles, the processing temperature generally ranges from about 50° C. to about 500° C., and more preferably from about 60° C. to about 400° C. For bulk particles, the temperature ranges from about 80° C. to about 1000° C. and more preferably from about 100° C. to about 800° C.

The heating preferably is continued for more than about 1 hour, and generally is continued for from about 2 hours to about 100 hours, preferably from about 10 hours to about 50 hours. For certain target product particles, additional heating does not lead to further variation in the particle composition. The atmosphere for the heating process generally is an oxidizing atmosphere. For conversion of amorphous particles to crystalline particles or from one crystalline structure to a different crystalline structure of essentially the same stoichiometry, the atmosphere generally can be inert. The atmosphere over the particles can be static, or gases can be flowed through the system.

Appropriate oxidizing gases include, for example, $O_2$, $O_3$, CO, $CO_2$, and combinations thereof. Oxidizing gases optionally can be mixed with inert gases such as Ar, He and $N_2$. When inert gas is mixed with the oxidizing gas, the gas mixture can be from about 1 percent oxidizing gas to about 99 percent oxidizing gas, and more preferably from about 5 percent oxidizing gas to about 99 percent oxidizing gas. Alternatively, either essentially pure oxidizing gas or pure inert gas can be used, as desired.

The precise conditions can be altered to vary the type of vanadium oxide product produced. For example, the temperature, time of heating, heating and cooling rates, the gases and the exposure conditions with respect to the gases can all be changed, as desired. Generally, while heating under an oxidizing atmosphere, the longer the heating period the more oxygen that is incorporated into the material, prior to reaching equilibrium. Once equilibrium conditions are reached, the overall conditions determine the crystalline phase of the powders.

A variety of ovens can be used to perform the heating. One embodiment is depicted in FIG. 1. Apparatus 50 includes a tube 52 into which the nanoparticles are placed. In this embodiment, tube 52 is approximately 1 inch in diameter. Tube 52 can be constructed from any material that can withstand the treatment conditions such as metals, ceramics and glasses. Preferred materials include, for example, quartz and stainless steel. Tube 52 generally is connected to oxidizing gas source 54 and inert gas source 56. Oxidizing gas, inert gas or combinations thereof, to produce the desired atmosphere, are placed within tube 52 from the appropriate gas source(s).

Preferably, the desired gases are flowed through tube 52. Various flow rates can be used. The flow rate preferably is between about 1 standard cubic centimeters per minute (sccm) to about 1000 sccm and more preferably from about 10 sccm to about 500 sccm. The flow rate generally is constant through the processing step, although the flow rate and the composition of the gas can be varied systematically over time during processing, if desired. Alternatively, a static gas atmosphere can be used.

Tube 52 is located within oven or furnace 58. Oven 58 can be adapted from a commercial furnace such as Mini-Mite™ 1100° C. Tube Furnace from Revco/Lindberg, Asheville, N.C. Oven 58 maintains the relevant portions of tube 52 at a relatively constant temperature, although the temperature can be varied systematically through the processing step, if desired. Temperature in oven 58 generally is measured with a thermocouple 60.

The vanadium oxide particles can placed in tube 52 within a vial 62. Vial 62 prevents loss of the particles due to gas flow. Vial 62 generally is oriented with the open end directed toward the direction of the source of the gas flow. Alternatively, the particles could be placed within a material that would permit gas flow while holding the particles in place. For example, the collection filter from the laser pyrolysis could be placed within the tube in an orientation that would tend to keep the particles on the filter material.

The starting material for the heat treatment can be any type of solid vanadium oxide compound. Suitable materials include, for example, VO, $VO_{1.27}$, $VO_2$, $V_2O_3$, $V_3O_5$ and amorphous $V_2O_5$. The starting materials generally can be particles of any size and shape. In addition, particles used as starting material can have been subjected to one or more prior heating steps under different conditions.

Nanoscale particles are preferred starting materials. The nanoscale particles have an average diameter of less than about 1000 nm and preferably from about 500 nm to about 5 nm, and more preferably from about 150 nm to about 5 nm. Suitable nanoscale starting materials have been produced by laser pyrolysis. The production of nanoscale particles is discussed further in commonly assigned and simultaneously filed patent application Ser. No. 08/897,778, entitled "Vanadium Oxide Nanoparticles," incorporated herein by reference.

A basic feature of successful application of laser pyrolysis for the production of vanadium oxide nanoparticles is production of a molecular stream containing a vanadium precursor, a radiation absorber and an oxygen source. The molecular stream is pyrolyzed by an intense laser beam. The intense heat resulting from the absorption of the laser radiation induces the oxidation of the vanadium precursor in the oxidizing environment. As the molecular stream leaves the laser beam, the vanadium oxide particles are rapidly quenched.

The reaction conditions determine the qualities of the vanadium oxide particles produced by laser pyrolysis. The appropriate reaction conditions to produce a certain type of nanoparticles generally depend on the design of the particular apparatus. The reaction conditions for laser pyrolysis can be controlled relatively precisely in order to produce vanadium oxides with desired properties.

Appropriate precursor compounds generally include vanadium compounds with sufficient vapor pressure to yield desired amounts of precursor vapor. Suitable vanadium precursor compounds include, for example, $VCl_3$, $VCl_4$, $VCCl$, $V(CO)_6$ and $VOCl_3$. The Cl in these representative precursor compounds can be replaced with other halogens, e.g., Br, I and F. Preferred oxygen sources include, for example, $O_2$, CO, $CO_2$, $O_3$ and mixtures thereof.

Preferred lasers include, for example, $CO_2$ lasers, which produce infrared radiation. Infrared absorbers for inclusion in the molecular stream include, for example, $C_2H_4$, $NH_3$, $SF_6$ and $O_3$. $O_3$ can act as both an infrared absorber and as an oxygen source. The radiation absorber, such as the infrared absorber, absorbs energy from the radiation beam and distributes the energy as heat to the other reactants to drive the pyrolysis.

An inert shielding gas can be used to reduce the amount of reactant and product molecules contacting the reactant chamber components. For the production of vanadium oxide nanoparticles, appropriate shielding gases include, for example, Ar, He and $N_2$.

Figure 2:
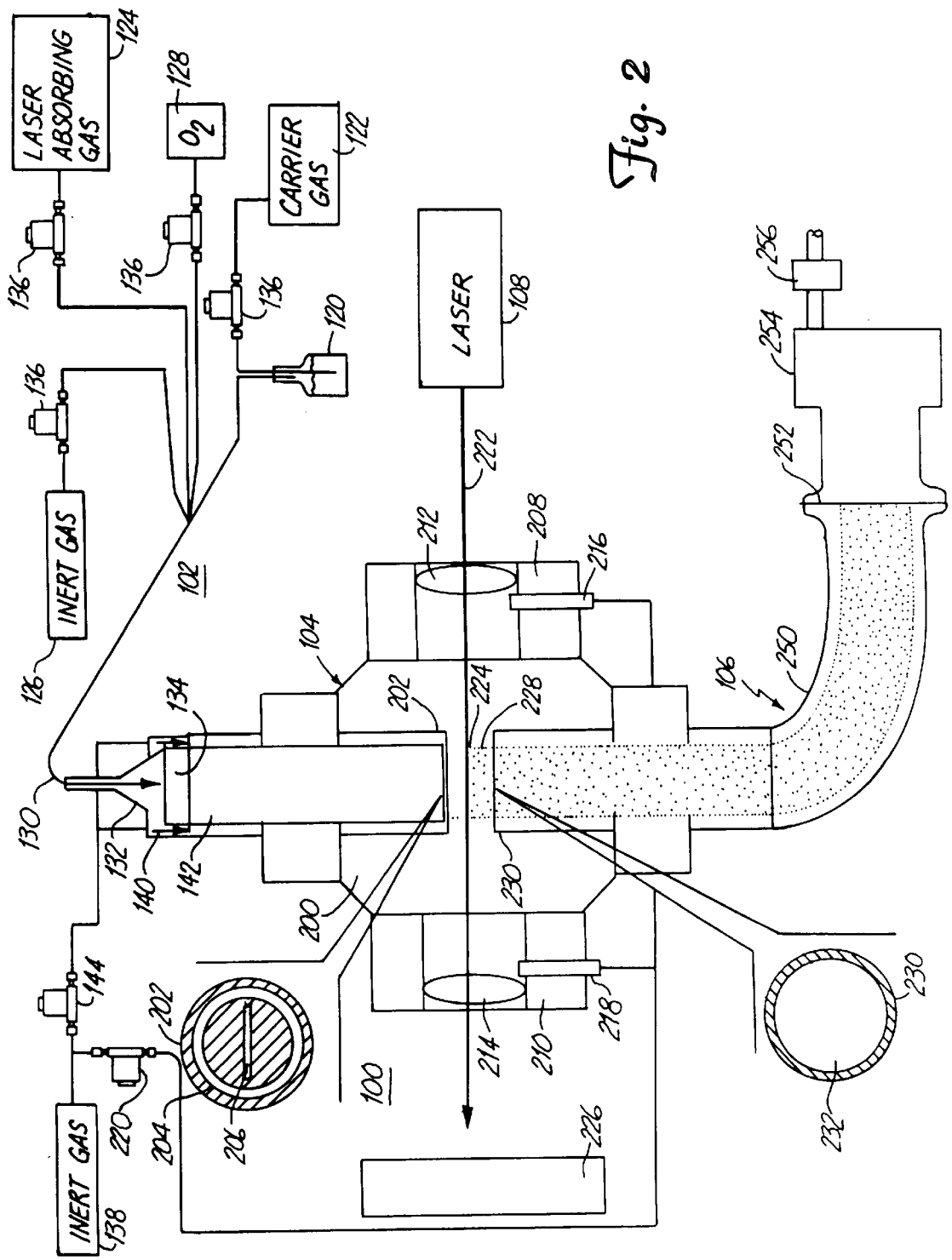
FIG. 2 is a schematic sectional view of an embodiment of a laser pyrolysis apparatus taken through the middle of the laser radiation path. The upper insert is a bottom view of the injection nozzle, and the lower insert is a top view of the collection nozzle.

Referring to FIG. 2, a pyrolysis apparatus 100 involves a reactant supply system 102, reaction chamber 104, collection system 106 and laser 108. Reactant supply system 102 includes a source 120 of vanadium precursor. For liquid precursors, a carrier gas from carrier gas source 122 can be introduced into precursor source 120, containing liquid precursor to facilitate delivery of the precursor. The carrier gas from source 122 preferably is either an infrared absorber or an inert gas and is preferably bubbled through the liquid vanadium precursor. The quantity of precursor vapor in the reaction zone is roughly proportional to the flow rate of the carrier gas.

Alternatively, carrier gas can be supplied directly from infrared absorber source 124 or inert gas source 126, as appropriate. The oxidizing agent is supplied from source 128, which can be a gas cylinder. The gases from the vanadium precursor source 120 are mixed with gases from oxidizing agent source 128, infrared absorber source 124 and inert gas source 126 by combining the gases in a single portion of tubing 130. The gases are combined a sufficient distance reaction chamber 104 such that the gases become well mixed prior to their entrance into reaction chamber 104. The combined gas in tube 130 passes through a duct 132 into rectangular channel 134, which forms part of an injection nozzle for directing reactants into reaction chamber 104.

Flow from sources 122, 124, 126 and 128 are preferably independently controlled by mass flow controllers 136. Mass flow controllers 136 preferably provide a controlled flow rate from each respective source. Suitable mass flow controllers include, for example, Edwards Mass Flow Controller, model 825 series, from Edwards High Vacuum International, Wilmington, Mass.

Inert gas source 138 is connected to an inert gas duct 140, which flows into annular channel 142. A mass flow controller 144 regulates the flow of inert gas into inert gas duct 140. Inert gas source 126 can also function as the inert gas source for duct 140, if desired.

The reaction chamber 104 includes a main chamber 200. Reactant supply system 102 connects to the main chamber 200 at injection nozzle 202. The end of injection nozzle 202 has an annular opening 204 for the passage of inert shielding gas and a rectangular slit 206 for the passage of reactant gases to form a molecular stream in the reaction chamber. Annular opening 204 has an diameter of about 1.5 inches and a width along the radial direction of about 1/16 in. The flow of shielding gas through opening 204 helps to prevent the spread of the reactant gases and product particles throughout reaction chamber 104.

Tubular sections 208, 210 are located on either side of injection nozzle 202. Tubular sections 208, 210 include ZnSe windows 212, 214, respectively. Windows 212, 214 are about 1 inch in diameter. Windows 212, 214 are preferably plano-focusing lenses with a focal length equal to the distance between the center of the chamber to the surface of the lens to focus the beam to a point just below the center of the nozzle opening. Windows 212, 214 preferably have an antireflective coating. Appropriate ZnSe lenses are available from Janos Technology, Townshend, Vt. Tubular sections 208, 210 provide for the displacement of windows 212, 214 away from main chamber 200 such that windows 212, 214 are less likely to be contaminated by reactants or products. Window 212, 214 are displaced, for example, about 3 cm from the edge of the main chamber 200.

Windows 212, 214 are sealed with a rubber o-ring to tubular sections 208, 210 to prevent the flow of ambient air into reaction chamber 104. Tubular inlets 216, 218 provide for the flow of shielding gas into tubular sections 208, 210 to reduce the contamination of windows 212, 214. Tubular inlets 216, 218 are connected to inert gas source 138 or to a separate inert gas source. In either case, flow to inlets 216, 218 is controlled with a mass flow controller 220.

Laser 108 is aligned to generate a laser beam 222 that enters window 212 and exits window 214. Windows 212, 214 define a laser light path through main chamber 200 intersecting the flow of reactants at reaction zone 224. After exiting window 214, laser beam 222 strikes power meter 226, which also acts as a beam dump. An appropriate power meter is available from Coherent Inc., Santa Clara, Calif. Laser 108 can be replaced with an intense conventional light source such as an arc lamp. Preferably, laser 108 is an infrared laser, especially a CW $CO_2$ laser such as an 1800 watt maximum power output laser available from PRC Corp., Landing, N.J. or a Coherent® model 525 (Coherent, Inc., Auburn, Calif.) with a maximum power output of 375 watts.

Reactants passing through slit 206 in injection nozzle 202 initiate a molecular stream. The molecular stream passes through reaction zone 224, where reaction involving the vanadium precursor takes place. Heating of the gases in reaction zone 224 is extremely rapid, roughly on the order of $10^5°$/sec depending on the specific conditions. The reaction is rapidly quenched upon leaving reaction zone 224, and nanoparticles 228 are formed in the molecular stream. The nonequilibrium nature of the process allows for the production of nanoparticles with a highly uniform size distribution and structural homogeneity.

The path of the molecular stream continues to collection nozzle 230. Collection nozzle 230 is spaced about 2 cm from injection nozzle 202. The small spacing between injection nozzle 202 and collection nozzle 230 helps reduce the contamination of reaction chamber 104 with reactants and products. Collection nozzle 230 has a circular opening 232. Circular opening 232 feeds into collection system 106.

The chamber pressure is monitored with a pressure gauge attached to the main chamber. The chamber pressure for the production of vanadium oxides preferably ranges from about 80 Torr to about 300 Torr.

Reaction chamber 104 has two additional tubular sections not shown. One of the additional tubular sections projects into the plane of the sectional view in FIG. 2, and the second additional tubular section projects out of the plane of the sectional view in FIG. 2. These additional tubular sections have windows for observing the inside of the chamber. In this configuration of the apparatus, the two additional tubular sections are not used to facilitate production of nanoparticles.

Collection system 106 can include a curved channel 250 leading from collection nozzle 230. Because of the buoyant nature of the nanoparticles, the product nanoparticles follow the flow of the gas around curves. Collection system 106 includes a filter 252 within the gas flow to collect the product nanoparticles. A variety of materials such as teflon, glass fibers and the like can be used for the filter as long as the material is inert and has a fine enough mesh to trap the particles. Preferred materials for the filter include, for example, a glass fiber filter from ACE Glass Inc., Vineland, N.J.

Pump 254 is used to maintain collection system 106 at a reduced pressure. A variety of different pumps can be used. An appropriate pump 254 is, for example, a Busch B0024 pump from Busch, Inc., Virginia Beach, Va., with a pumping capacity of about 25 cubic feet per minute. It may be desirable to flow the exhaust of the pump through a scrubber 256 to remove any remaining reactive chemicals before venting into the atmosphere. The entire apparatus 100 can be placed in a fume hood for ventilation purposes and for safety considerations. Generally, the laser remains outside of the fume hood because of its large size.

The apparatus is controlled by a computer. Generally, the computer controls the laser and monitors the pressure in the reaction chamber. The computer can be used to control the flow of reactants and/or the shielding gas. The pumping rate is controlled by either a manual needle valve or an automatic throttle valve inserted between pump 254 and filter 252. As the chamber pressure increases due to the accumulation of particles on filter 252, the manual valve or the throttle valve can be adjusted to maintain the pumping rate and the corresponding chamber pressure.

The reaction can be continued until sufficient nanoparticles are collected on the filter 252 such that the pump can no longer maintain the desired pressure in the reaction chamber 104 against the resistance through filter 252. When the pressure in reaction chamber 104 can no longer be maintained at the desired value, the reaction is stopped, and filter 252 is removed. With this embodiment, about 3–5 grams of nanoparticles can be collected in a single run. Therefore, it is straightforward to produce a macroscopic quantity of nanoparticles, i.e., a quantity visible with the naked eye.

The configuration of the reactant supply system 102 and the collection system 106 can be reversed. In this alternative configuration, the reactants can be supplied from the bottom of the reaction chamber while the products are collected from the top of the chamber. In this configuration, it is especially preferred to include a curved section in the collection system so that the collection filter is not mounted directly above the reaction chamber.

An alternative laser pyrolysis apparatus has been described. See, commonly assigned U.S. patent application Ser. No. 08/808,850, entitled "Efficient Production of Particles by Chemical Reaction," incorporated herein by reference. This alternative design is intended to facilitate production of commercial quantities of nanoparticles.

B. Properties of Materials

Vanadium oxide has a intricate phase diagram due to the many possible oxidation states of vanadium. Vanadium is known to exist in oxidation states between $V^{+5}$ and $V^{+2}$. The energy differences between the oxides of vanadium in the different oxidation states is not large. Therefore, it is possible to produce stoichiometric mixed valence compounds. Known forms of vanadium oxide include VO, $VO_{1.27}$, $V_2O_3$, $V_3O_5$, $VO_2$, $V_6O_{13}$, $V_4$, $O_9$, $V_3O_7$, and $V_2O_5$. The present heat treatment approach is useful for increasing the oxidation state of vanadium oxide particles or for converting vanadium oxide particles to more ordered phases.

The vanadium oxides generally form crystals with octahedral or distorted octahedral coordination. Specifically, VO, $V_2O_3$, $VO_2$, $V_6O_{13}$ and $V_3O_7$ can form crystals with octahedral coordination. In addition, $V_3O_7$ can form crystals with trigonal bipyramidal coordination. $V_2O_5$ forms crystals with square pyramidal or distorted octahedral coordination. $V_2O_5$ recently also has been produced in a two dimensional crystal structure. See, M. Hibino, et al., Solid State Ionics 79:239–244 (1995). When produced under appropriate conditions, the vanadium oxide nanoparticles can be amorphous. The crystalline lattice of the vanadium oxide can be evaluated using x-ray diffraction measurements.

With heat processing, an increase in the oxidation state of vanadium within a vanadium oxide particles is generally accomplished within an oxidizing atmosphere. The conversion of a vanadium oxide to a more ordered crystalline lattice with the same stoichiometry generally can be accomplished with an oxidizing atmosphere or an inert atmosphere.

The starting materials for the heat processing preferably are nanoscale particles. The nanoscale particles can have an average diameter from about 5 nm to about 1000 nm, and preferably from about 5 nm to about 500 nm, more preferably from about 5 nm to about 150 nm, and even more preferably from about 5 nm to about 100 nm. Appropriate nanoparticles for heat treatment can have any shape. Vanadium oxide particles produced by laser pyrolysis, as described above, have a roughly spherical gross appearance. Upon closer examination, the particles have facets corresponding to the underlying crystal lattice. Diameter measurements on particles on particles with asymmetries are based on an average of length measurements along the principle axes of the particle. The measurements along the principle axes preferably are each less than about 1 micron for at least 98 percent of the nanoparticles.

Because of the small size of the nanoparticles, they tend to form loose agglomerates due to van der Waals forces between nearby particles. Nevertheless, the nanometer scale of the particles is clearly observable in transmission electron micrographs of the particles. Furthermore, the particles manifest unique properties due to their small size, as described below with respect to use of vanadium oxide nanoparticles in lithium based batteries.

The nanoparticles preferably have a high degree of uniformity in size. As determined from examination of transmission electron micrographs, the particles generally have a distribution in sizes such that at least about 95 percent of the particles have a diameter that is greater than 40 percent of the average diameter and less than 160 percent of the average diameter. Preferably, the nanoparticles have a distribution of diameters such that at least about 95 percent of the particles have a diameter that is greater than about 60 percent of the average diameter and less than 140 percent of the average diameter. In addition, the nanoparticles generally have a very high purity level.

Appropriate vanadium oxide nanoparticles incorporated into a cathode for a battery exhibit a significantly increased energy density relative to comparable materials of larger particle size. Certain forms of vanadium oxide are known to incorporate lithium ions into its structure through intercalation or similar mechanisms such as topochemical absorption. Intercalation of lithium ions into suitable forms of a vanadium oxide lattice forms $Li_xVO_y$. Appropriate vanadium oxides can be an effective electroactive material for a cathode in either a lithium or lithium ion battery.

The vanadium oxide nanoparticles can be incorporated into a film with a polymeric binder, which is appropriate for use as a cathode. While some of the vanadium oxides are reasonable electrical conductors, the film preferably incorporates additional electrically conductive particles held by the binder along with the vanadium oxide particles. The cathode film can be used in a lithium battery or a lithium ion battery.

The anode can be constructed from a variety of materials that are suitable for use with lithium ion electrolytes. In the case of lithium batteries, the anode can include lithium metal or lithium alloy metal either in the form of a foil, grid or metal particles in a binder.

A separator element is located between the cathode and anode. The separator element is electrically insulating and provides for passage of at least some types of ions. Ionic transmission through the separator provides for electrical neutrality in the different sections of the cell. The separator generally prevents contact of electrically active compounds in the cathode from contacting electrically active compounds in the anode. A variety of materials can be used for the separator. Electrolytes for lithium batteries or lithium ion batteries can include any of a variety of lithium salts.

Lithium intercalated vanadium oxide is formed in the battery during discharge. The lithium leaves the lattice upon recharging, i.e., when a voltage is applied to the cell such that electric current flows into the cathode due to the application of an external EMF to the battery. Intercalation generally is reversible, making certain vanadium oxides suitable for the production of secondary batteries.

With vanadium oxides nanoparticles, very high energy densities have been achieved. Preferred vanadium oxide nanoparticles have energy densities significantly greater than the theoretical maximum values for the corresponding bulk vanadium oxide particles. Preferably, the vanadium oxide nanoparticles have energy densities at least about 150 percent of the theoretical maximum of the bulk material, and more preferably at least about 200 percent of the theoretical maximum of the bulk material. Specifically, preferred vanadium oxide nanoparticles have an energy density of at least about 900 Wh/kg, more preferably at least about 1000 Wh/kg. Vanadium oxide nanoparticles in a lithium based battery can exhibit an energy density in the range from about 1000 Wh/kg to about 1200 Wh/kg.

EXAMPLES

The heat treatments described in the Examples were preformed in an oven essentially as described above with respect to FIG. 1. Between about 100 and about 300 mg of nanoparticles were placed within an open 1 cc vial within the tube in the oven. The specific conditions for heat processing are described in the examples below.

The starting materials for following examples were nanoparticles produced using laser pyrolysis. A laser pyrolysis apparatus essentially as described in FIG. 2 was used to produce the starting material nanoparticles. The precursor for laser pyrolysis was $VOCl_3$, which was conveyed by bubbling a suitable carrier gas through the liquid precursor. The particular conditions of the laser pyrolysis are discussed in the specific examples below.

Example 1—Orthorhombic $V_2O_5$ from $VO_2$ Nanoparticles

The starting materials for the heat treatment were $VO_2$ nanoparticles produced by laser pyrolysis. The parameters for the laser pyrolysis are described in the first column of values in Table 1.

TABLE 1

Figure 3:
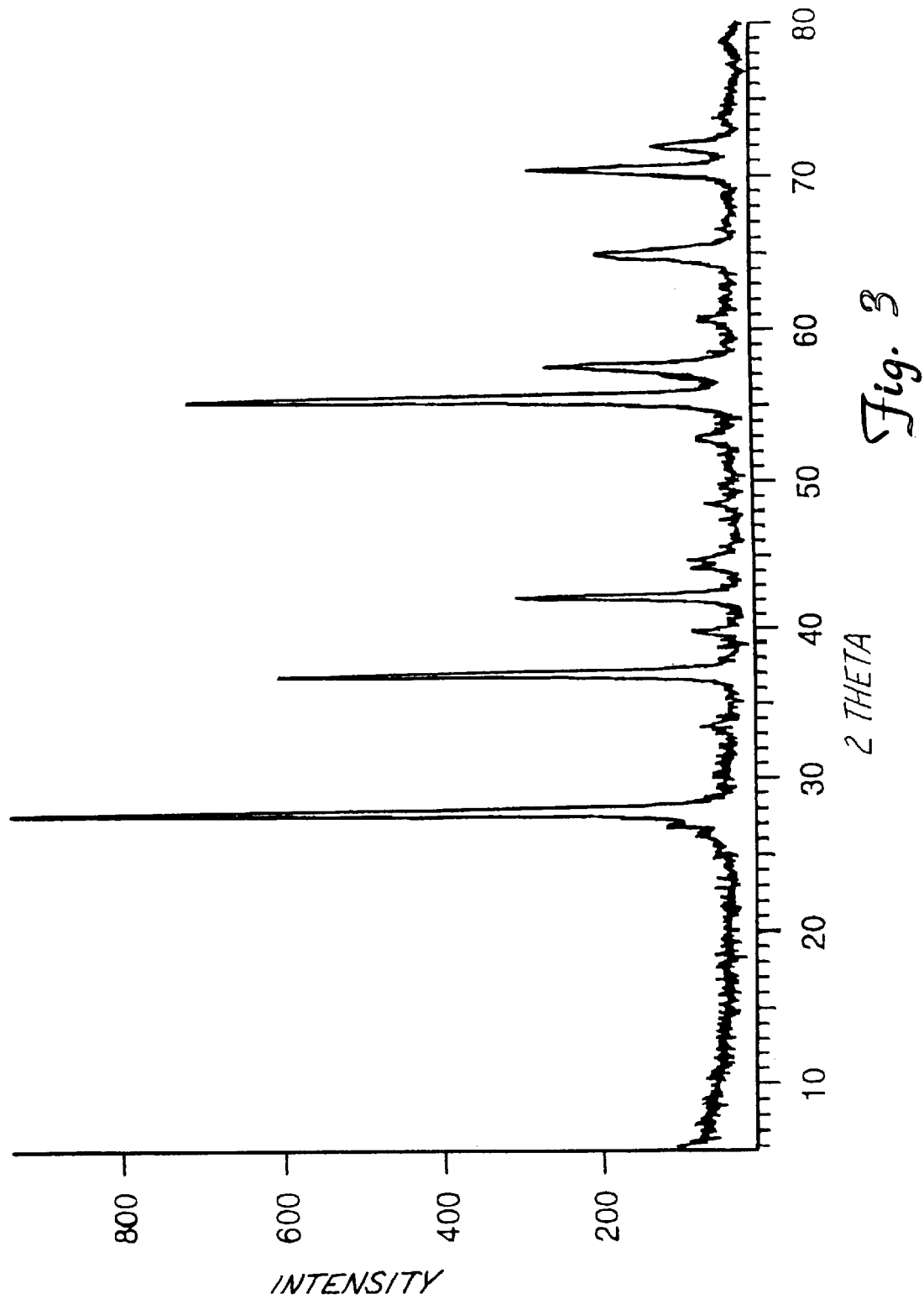
FIG. 3 is an x-ray diffractogram of $VO_2$ nanoparticles.

| Phase | $VO_2$ | $VO_2$ | $V_2O_5$ |
|---|---|---|---|
| Crystal Structure | Monoclinic | Monoclinic | Amorphous |
| Pressure (Torr) | 127 | 100 | 142.5 |
| Argon F.R. - Win (sccm) | 700 | 700 | 700 |
| Argon F.R. - Sld. (slm) | 0.98 | 5.6 | 0.98 |
| Ethylene (sccm) | 268 | 311 | 1072 |
| Carrier Gas (sccm) | 676 (Ar) | 311 (ethyl.) | 676 (Ar) |
| Oxygen (sccm) | 200 | 84 | 642 |
| Laser Output (watts) | 220 | 102 | 215 |
| Nozzle Size | 5/8" × 1/16" | 5/8" × 1/16" | 5/8" × 1/16" | sccm = standard cubic centimeters per minute
slm = standard liters per minute
Argon - Win. = argon flow through inlets 216, 218
Argon - Sld. = argon flow through annular channel 142
An x-ray diffractogram of the $VO_2$ nanoparticles is shown in FIG. 3.

Figure 4:
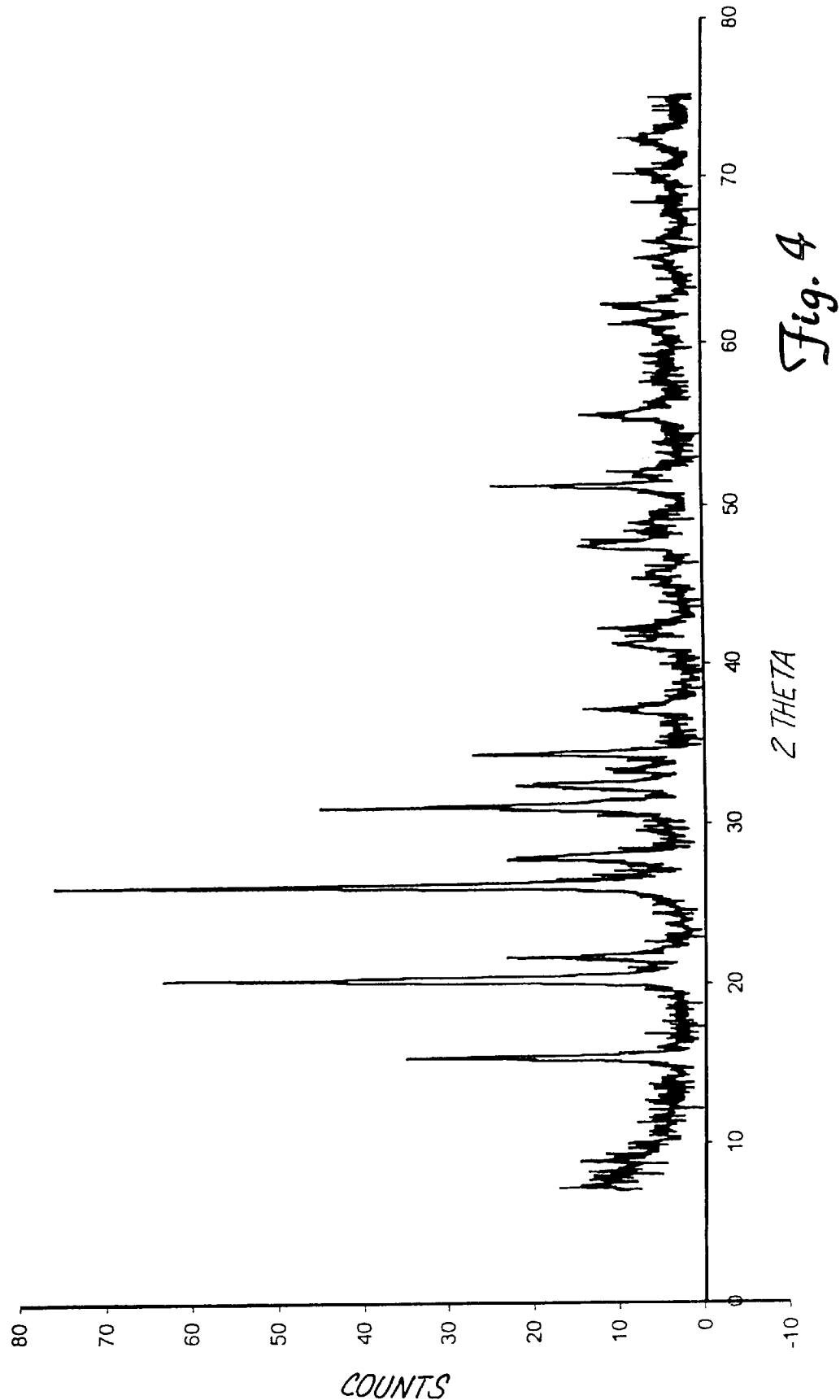
FIG. 4 is an x-ray diffractogram of crystalline $V_2O_5$ nanoparticles made from $VO_2$ nanoparticles.

The nanoparticles were heat treated at a temperature of 202° C. with oxygen gas flowed through a 1 inch tube at a rate of 105.6 sccm. The heat treatment was continued for about 16 hours. The resulting nanoparticles were single phase crystalline $V_2O_5$ nanoparticles. The x-ray diffractogram of this material is shown in FIG. 4. From the x-ray diffractogram, it could be determined that the resulting particles were orthorhombic $V_2O_5$.

Crystalline $V_2O_5$ produced in this way was used to fabricate a cathode. The resulting cathode was tested in a lithium battery. It was found that the $V_2O_5$ nanoparticles exhibited an energy density of about 919 Wh/kg. The testing was described in copending application Ser. No. 08/897,776, entitled "Batteries With Electroactive Nanoparticles," incorporated herein by reference.

Figure 5:
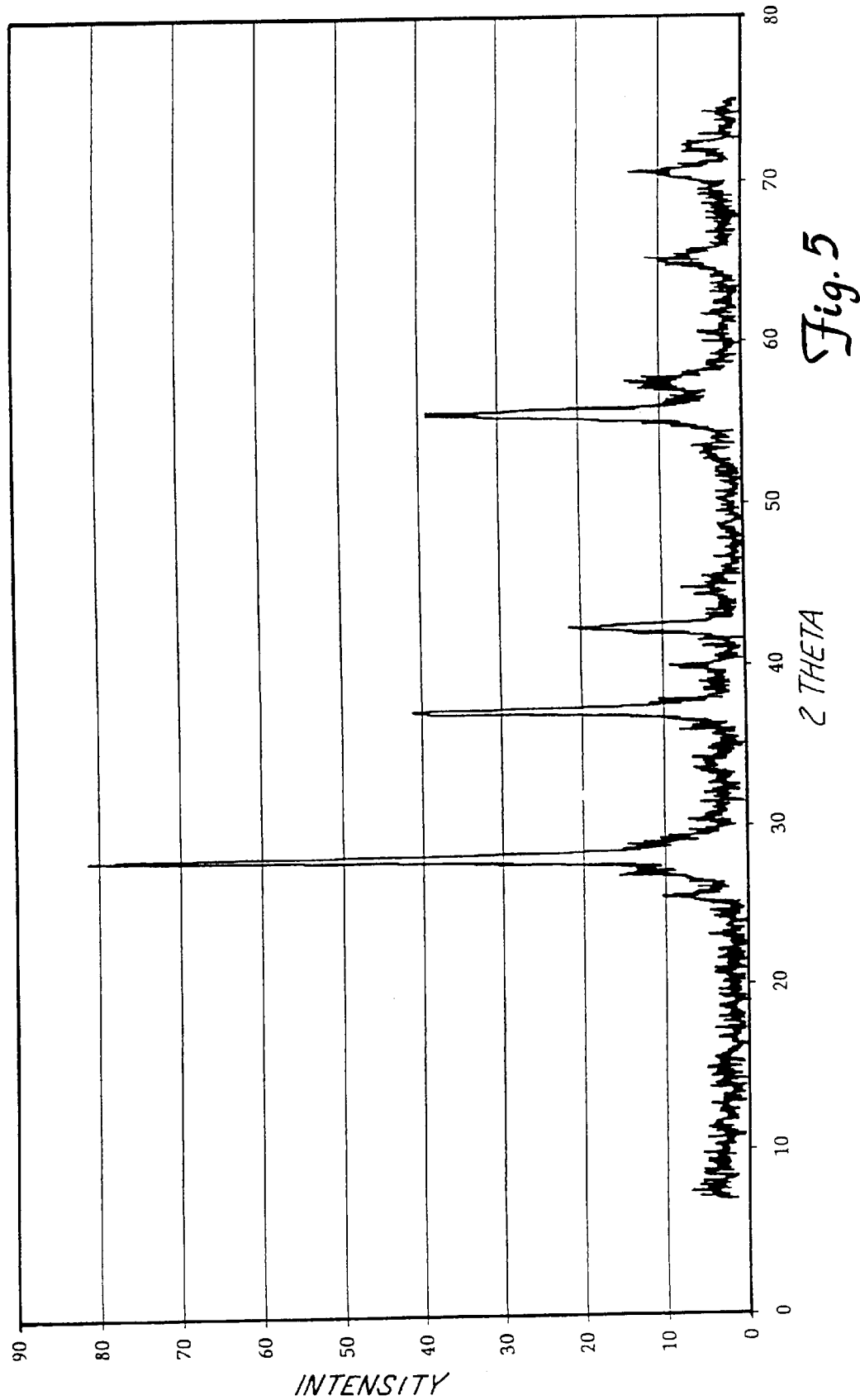
FIG. 5 is an x-ray diffractogram of $VO_2$ nanoparticles produced under different conditions from the particles used to produce the diffractogram of FIG. 3.

Additional samples of crystalline $V_2O_5$ were made from nanoparticles of crystalline $VO_2$. The laser pyrolysis conditions to produce the $VO_2$ nanoparticles are presented in the second column of values in Table 1. The x-ray diffractogram for the $VO_2$ nanoparticles is shown in FIG. 5. Three sample of the $VO_2$ nanoparticles were subjected to heat treatment.

Figure 6:
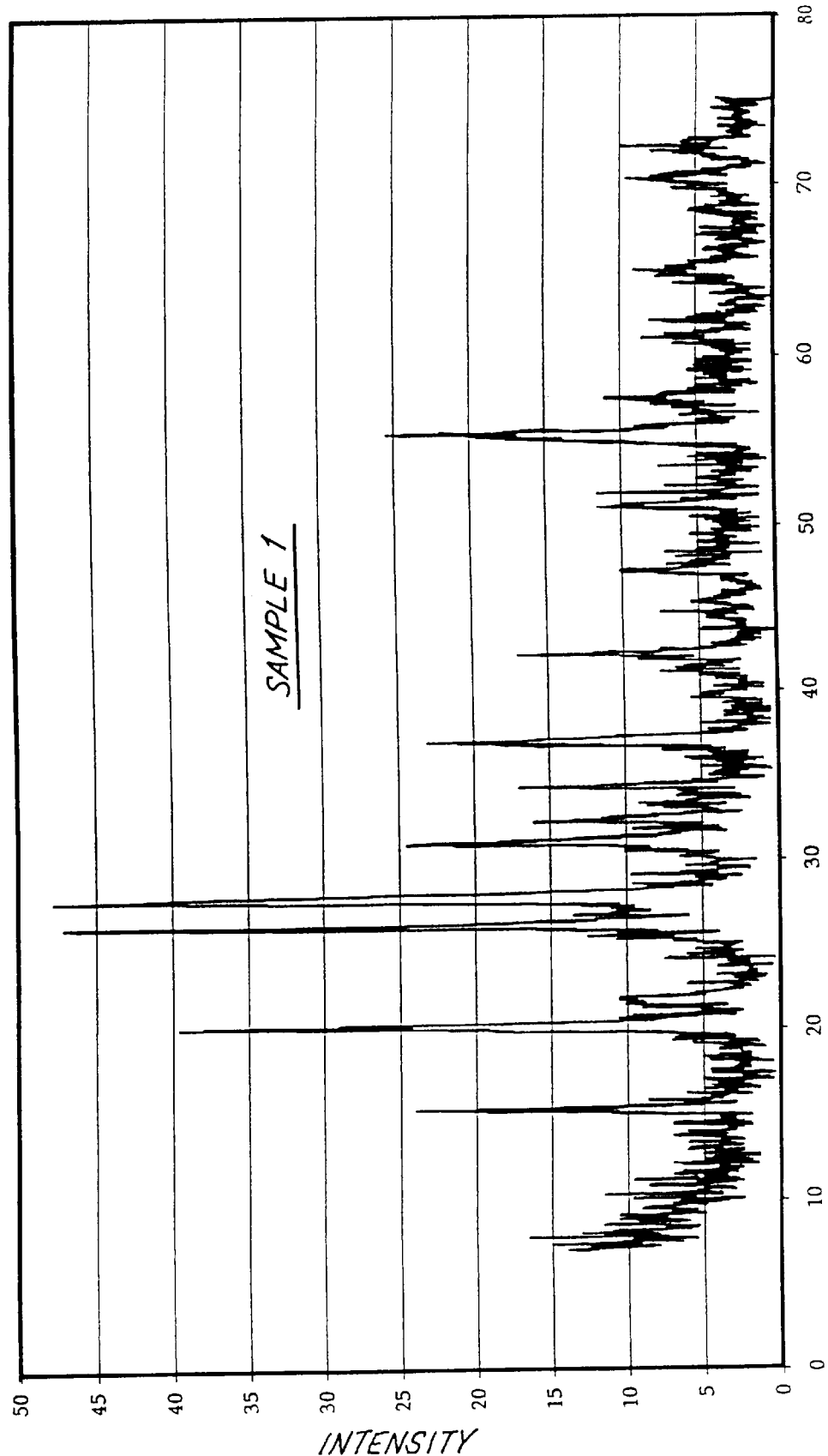
FIG. 6 is an x-ray diffractogram of crystalline $V_2O_5$ nanoparticles made with a flow rate of $O_2$ of 4.8 sccm.
Figure 7:
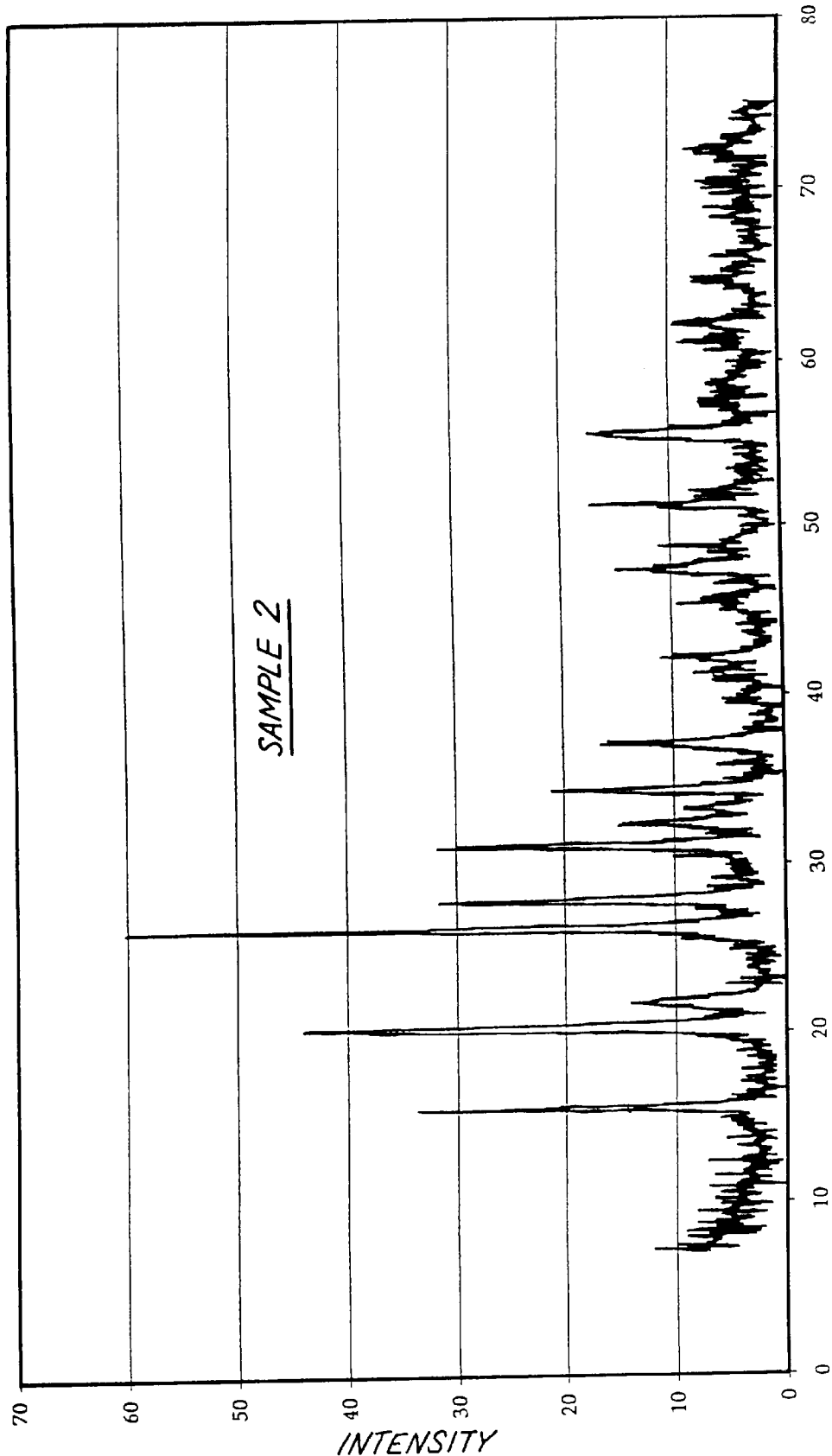
FIG. 7 is an x-ray diffractogram of crystalline $V_2O_5$ nanoparticles made with a flow rate of $O_2$ of 10.1 sccm.
Figure 8:
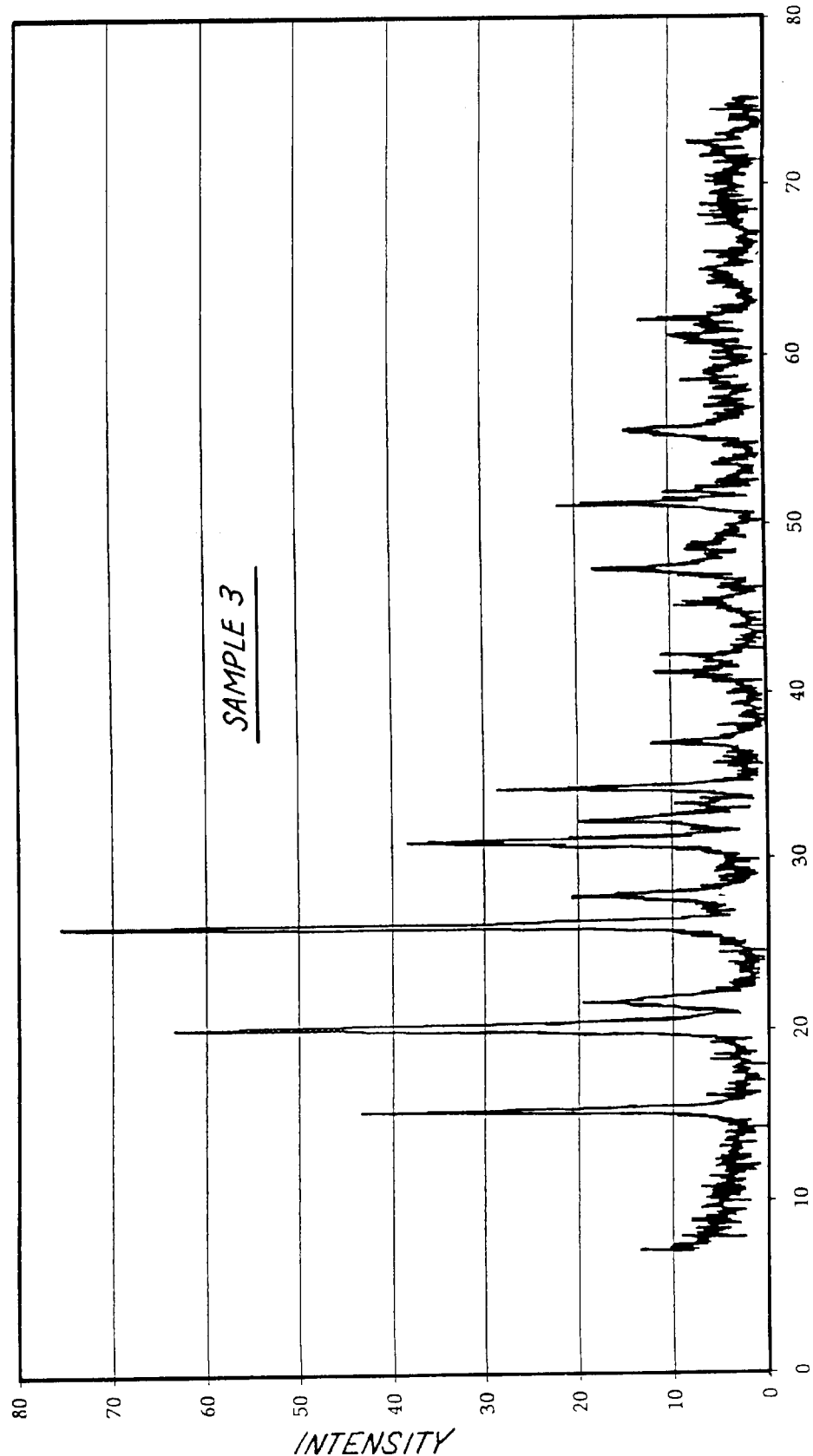
FIG. 8 is an x-ray diffractogram of crystalline $V_2O_5$ nanoparticles made with a flow rate of $O_2$ of 20.9 sccm.

All three samples were treated for 17 hours in the 1 inch quartz tube with an flow of inert gas (Ar) of 103 sccm. Samples 1, 2 and 3, in addition, had $O_2$ flow rates of 4.8 scam, 10.1 scam and 20.9 scam, respectively. Samples 1 and 2 were heated at 224° C. while sample 3 was heated at a temperature of 221° C. The x-ray diffractograms of the three samples are shown in FIGS. 6—8, respectively.

Example 2—Orthorhombic $V_2O_5$ from Amorphous $V_2O_5$ Nanoparticles

Figure 9:
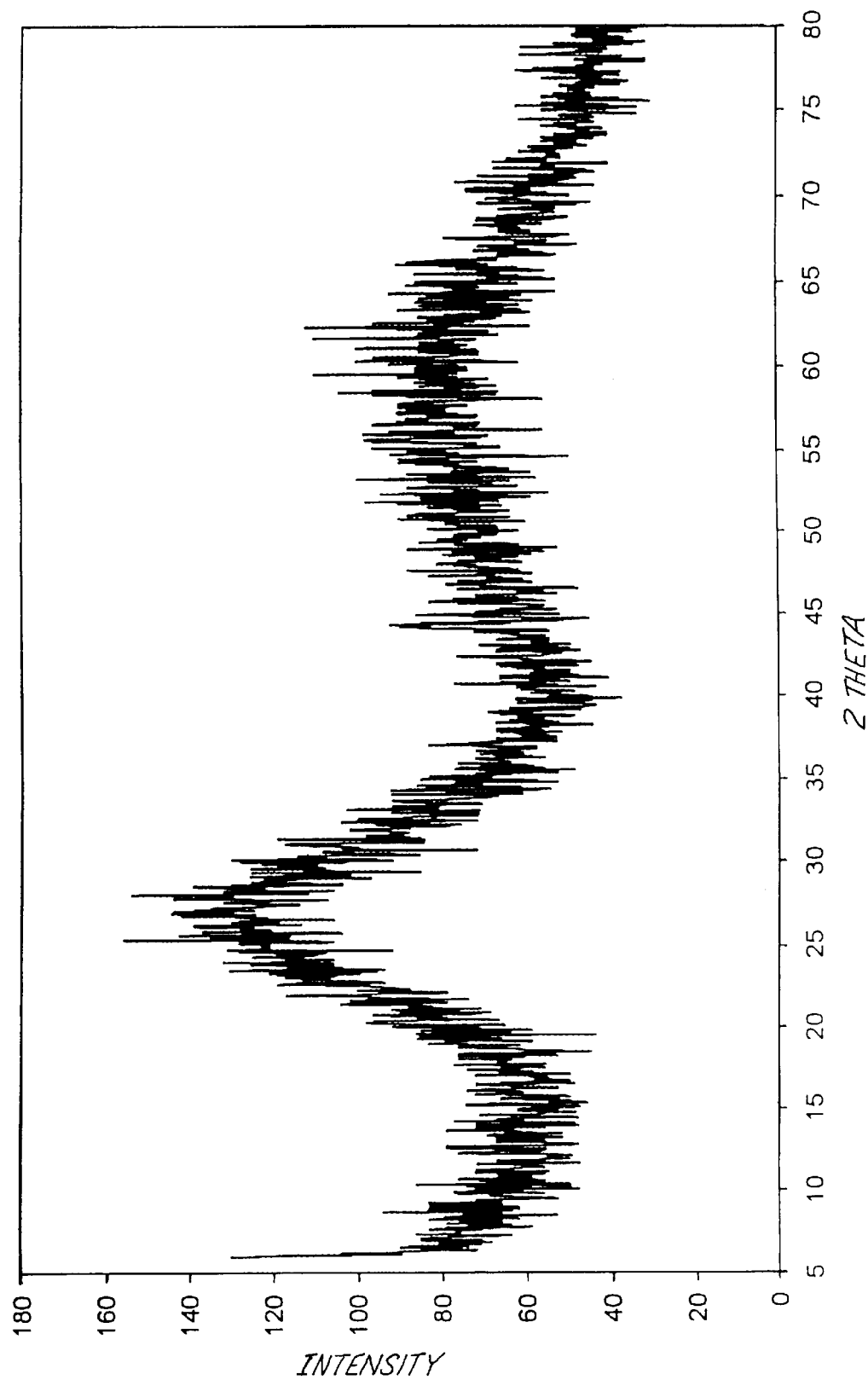
FIG. 9 is an x-ray diffractogram of amorphous $V_2O_5$ nanoparticles.

The starting materials for the heat treatment were amorphous $V_2O_5$ nanoparticles produced by laser pyrolysis. The parameters for the laser pyrolysis are described in Table 1. An x-ray diffractogram of the amorphous $V_2O_5$ particles is shown in FIG. 9.

Figure 10:
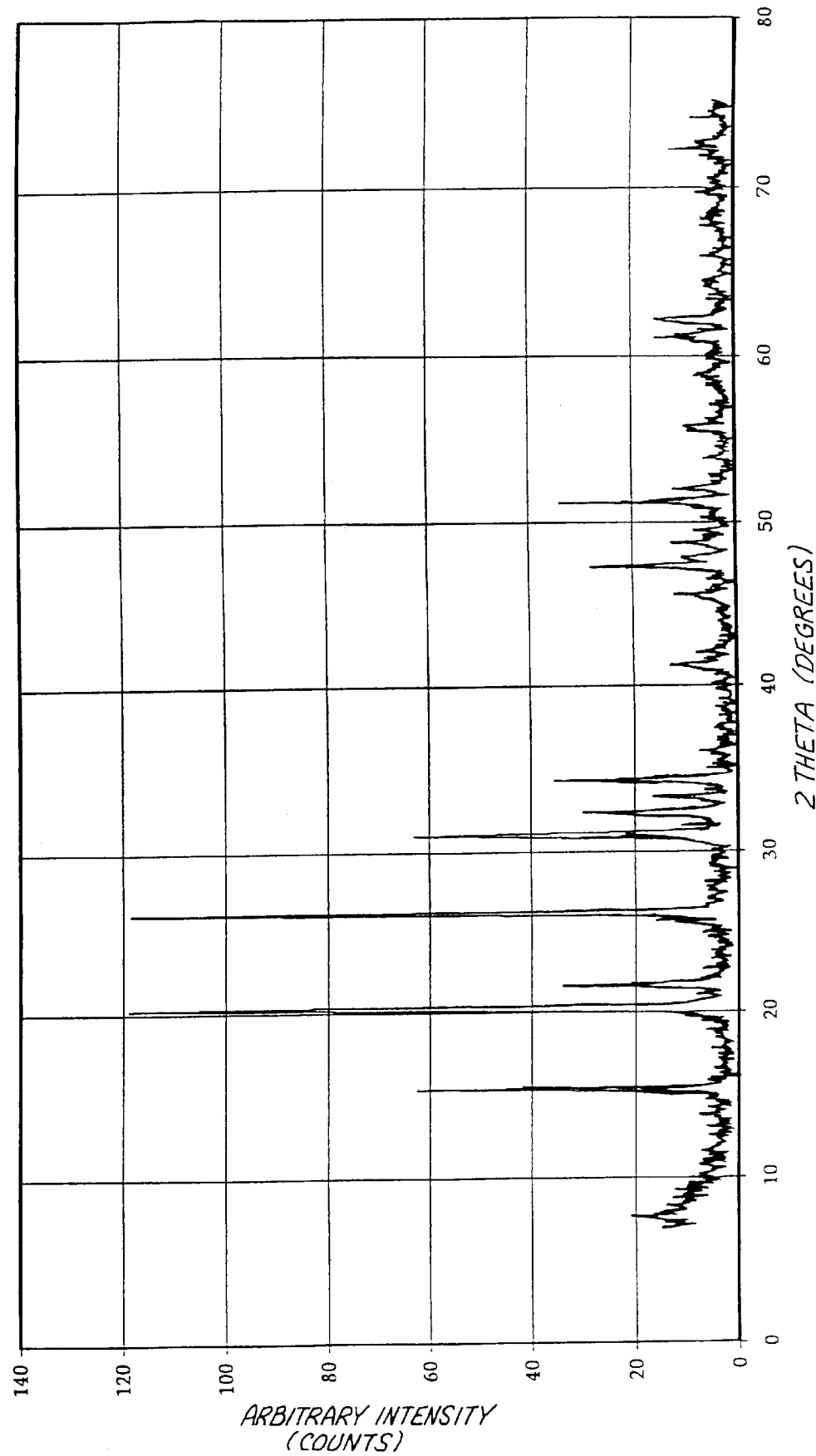
FIG. 10 is an x-ray diffractogram of crystalline $V_2O_5$ nanoparticles made from amorphous $V_2O_5$ nanoparticles.

The amorphous $V_2O_5$ nanoparticles were heat treated at a temperature of 202° C. with oxygen gas flowed through a 1 inch tube at a rate of 105.6 sccm. The heat treatment was continued for about 16 hours. The resulting nanoparticles were single phase crystalline $V_2O_5$ nanoparticles. The x-ray diffractogram of the heat treated nanoparticles is shown in FIG. 10. The x-ray diffractogram again is characteristic of orthorhombic $V_2O_5$.

These crystalline nanoparticles were also formed into a cathode. The cathode was tested in a lithium battery as described in Example 1. The vanadium oxide material exhibited an energy density of 1005 Wh/kg.

Example 3—2-D $V_2O_5$ from $VO_2$ Nanoparticles

Figure 11:
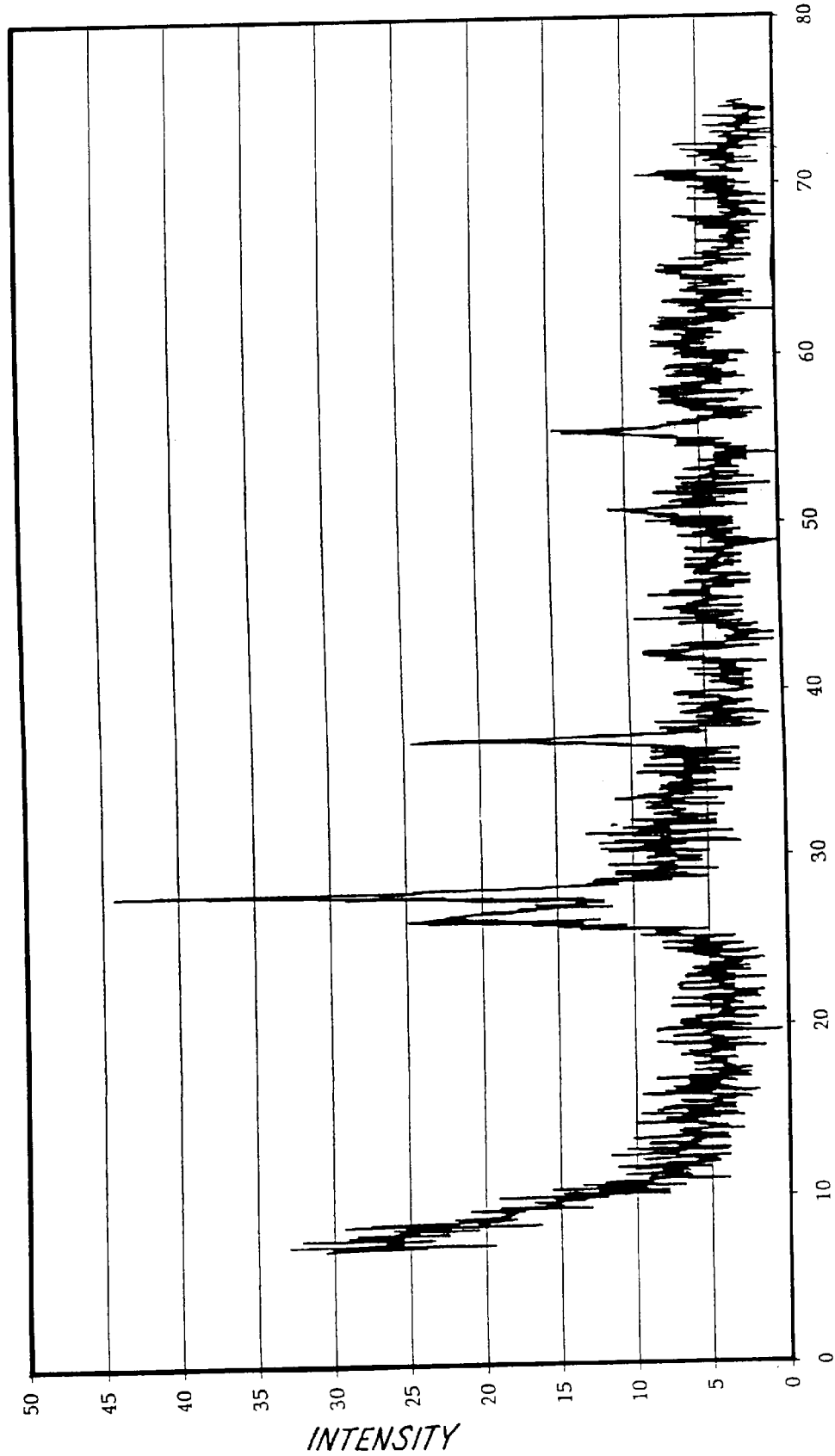
FIG. 11 is an x-ray diffractogram of mixed phase 2-D crystalline $V_2O_5/VO_2$ made from $VO_2$ nanoparticles.

The initial $VO_2$ nanoparticles were from the same batch of nanoparticles produced by laser pyrolysis described in Example 1 with parameters given in the first column of values in Table 1. The $VO_2$ nanoparticles were heated at 105° C. for about 21 hours. During heating, $O_2$ was flowed through the tube at a rate of 106 sccm. The resulting particles had a significant portion of 2-D crystalline $V_2O_5$ with a significant fraction of the particles remaining as crystalline $VO_2$. The x-ray diffractogram is shown in FIG. 11.

Example 4—2-D $V_2O_5$ from Amorphous $V_2O_5$ Nanoparticles

Figure 12:
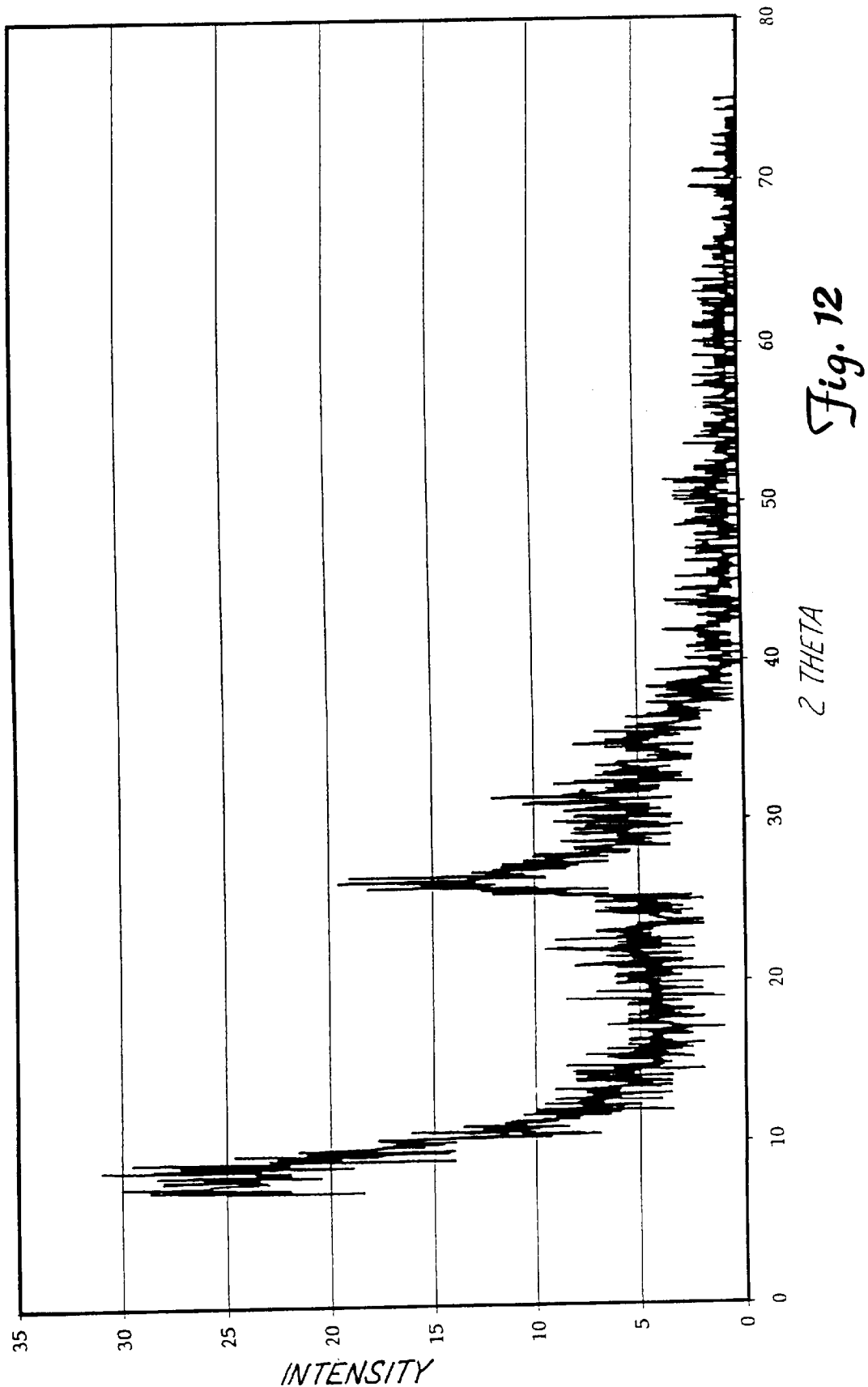
FIG. 12 is an x-ray diffractogram of 2-D crystalline $V_2O_5$ made from amorphous $V_2O_5$.

The initial amorphous $V_2O_5$ nanoparticles were from the same batch of nanoparticles produced by laser pyrolysis described in Example 2 with parameters given in the third column of values in Table 1. The amorphous $V_2O_5$ nanoparticles were heated at 105° C. for about 21 hours. During heating, $O_2$ was flowed through the tube at a rate of 106 sccm. The resulting particles had an x-ray diffractogram characteristic of 2-D crystalline $V_2O_5$, as shown in FIG. 12.

The embodiments described above are intended to be representative and not limiting. Additional embodiments of the invention are within the claims. As will be understood by those skilled in the art, many changes in the methods and apparatus described above may be made by the skilled practitioner without departing from the spirit and scope of the invention, which should be limited only as set forward in the claims which follow.

What is claimed is:

1. A process for converting nanoparticles of vanadium oxide to another form of vanadium oxide, the process comprising heating the nanoparticles of vanadium oxide in an oxidizing or inert atmosphere at a temperature between about 60° C. and about 800° C., the temperature being below the melting point of both the nanoparticles of vanadium oxide and the other form of vanadium oxide, the nanoparticles of vanadium oxide having an average diameter from about 5 nm to about 1000 nm.

2. The process of claim 1 wherein the temperature is between about 60° C. and about 400° C.

3. The process of claim 1 wherein the temperature is between about 60° C. and about 500° C.

4. The process of claim 1 wherein the heating is performed in an oxidizing atmosphere.

5. The process of claim 4 wherein the oxidizing atmosphere comprises between about 1 percent oxidizing gas and about 99 percent oxidizing gas by partial pressure.

6. The process of claim 4, wherein the oxidizing atmosphere comprises $O_2$, $O_3$, CO, $CO_2$ or combinations thereof.

7. The process of claim 4 wherein the oxidizing atmosphere comprises flowing gas.

8. The process of claim 1 wherein the nanoparticles of vanadium oxide comprise $VO_{1.27}$, $VO_2$, $V_2O_3$, $V_3O_5$, amorphous $V_2O_5$ or 2-D crystalline $V_2O_5$.

9. The process of claim 1 wherein the other forms of vanadium oxide comprise 2-D crystalline $V_2O_5$ or crystalline $V_2O_5$.

10. The process of claim 1 wherein the nanoparticles of vanadium oxide have an average diameter from about 5 nm to about 500 nm.

11. The process of claim 1 wherein the nanoparticles of vanadium oxide have an average diameter from about 5 nm to about 150 nm.

12. Vanadium oxide nanoparticles formed by the process of claim 11.

13. Vanadium oxide nanoparticles formed by the process of claim 1.

14. A process for forming a powder comprising vanadium oxide particles, the process comprising heating particles of vanadium oxide with a lower oxygen to vanadium ratio than the vanadium oxide particles to be formed in an oxidizing atmosphere at a temperature between about 60° C. and about 800° C., the temperature being below the melting point of both the vanadium oxide particles to be heated and the product vanadium oxide particles to be formed.

15. Vanadium oxide nanoparticles formed by the process of claim 14.

16. The process of claim 14 wherein the temperature is between about 60° C. and about 500° C.

17. The process of claim 14 wherein the oxidizing atmosphere comprises $O_1$, $O_3$, CO, $CO_2$, or combinations thereof.

18. The process of claim 14 wherein the oxidizing atmosphere comprises from about 1 percent oxidizing gas and 99 percent oxidizing gas by partial pressure.

19. The process of claim 14 wherein the initial vanadium oxide particles have an average diameter from about 5 nm to about 1000 nm.

20. The process of claim wherein the initial vanadium oxide particles have an average diameter from about 5 nm to about 150 nm.

21. The process of claim 14 wherein the product vanadium oxide particles comprise orthorhombic $V_2O_5$ crystals.

22. The process of claim 14 wherein the product vanadium oxide particles comprise 2-D $V_2O_5$ crystals.

23. A process for forming crystalline $V_2O_5$ particles, the method comprising heating amorphous $V_2O_5$ particles at a temperature between about 60° C. and about 800° C., the temperature being below the melting point of both the amorphous $V_2O_5$ particles and the crystalline $V_2O_5$ particles, the amorphous $V_2O_5$ particles having an average diameter from about 5 nm to about 1000 nm.

24. Vanadium oxide nanoparticles formed by the process of claim 23.

25. The process of claim 23 wherein the temperature is between about 60° C. and about 500° C.

* * * * *

UNITED STATES PATENT AND TRADEMARK OFFICE
CERTIFICATE OF CORRECTION

PATENT NO. : 5,989,514
DATED : November 23, 1999
INVENTOR(S) : Xiangxin Bi; James T. Gardner; Sujeet Kumar and Nobuyuki Kambe It is certified that error appears in the above-identified patent and that said Letters Patent is hereby corrected as shown below:

Col. 12, line 48, after "claim" insert --14--.

Signed and Sealed this

Fifteenth Day of May, 2001

Attest:

NICHOLAS P. GODICI

Attesting Officer  Acting Director of the United States Patent and Trademark Office